Figure 1:
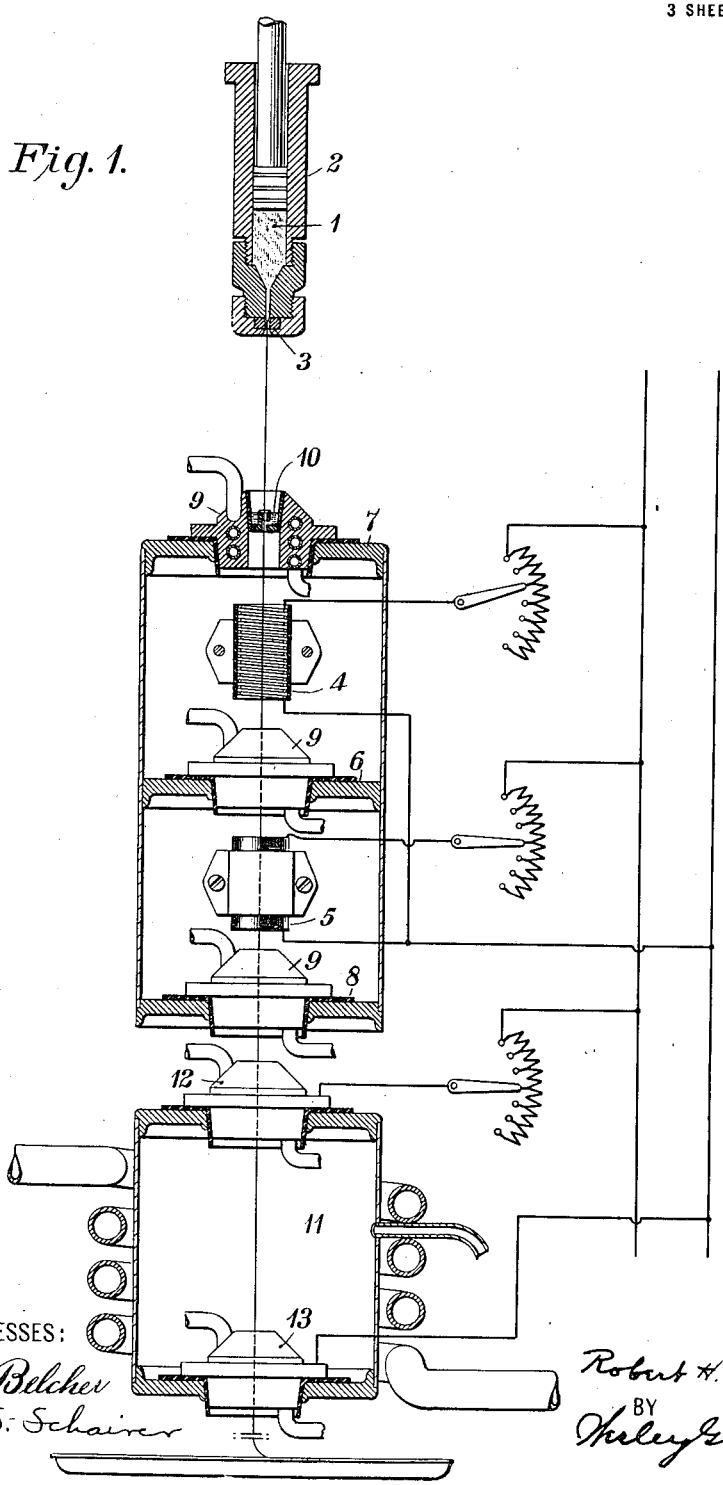

R. H. HENDERSON.
PROCESS FOR MANUFACTURING INCANDESCENT FILAMENTS.
APPLICATION FILED MAR. 25, 1910.

1,144,595.

Patented June 29, 1915.

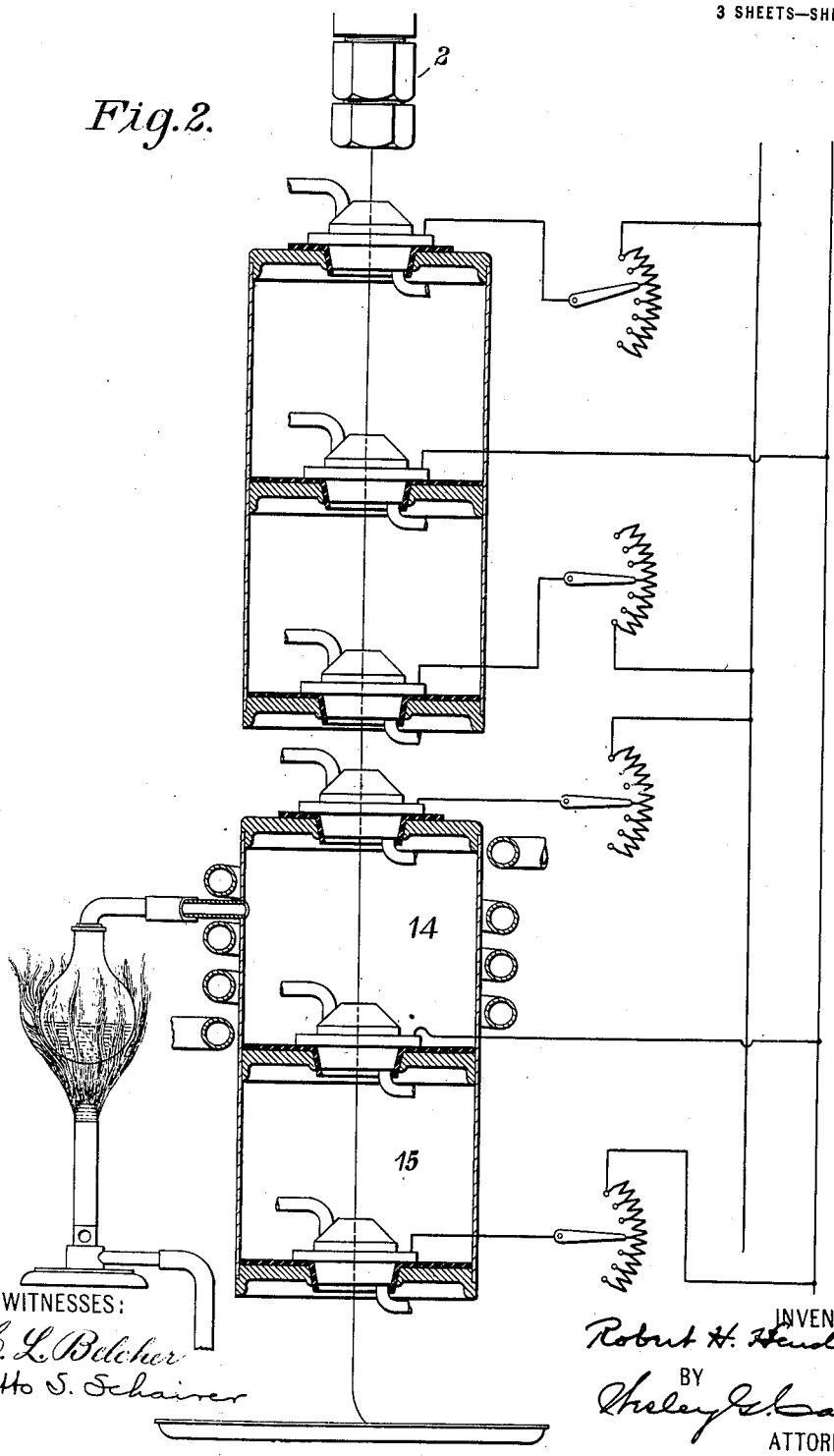

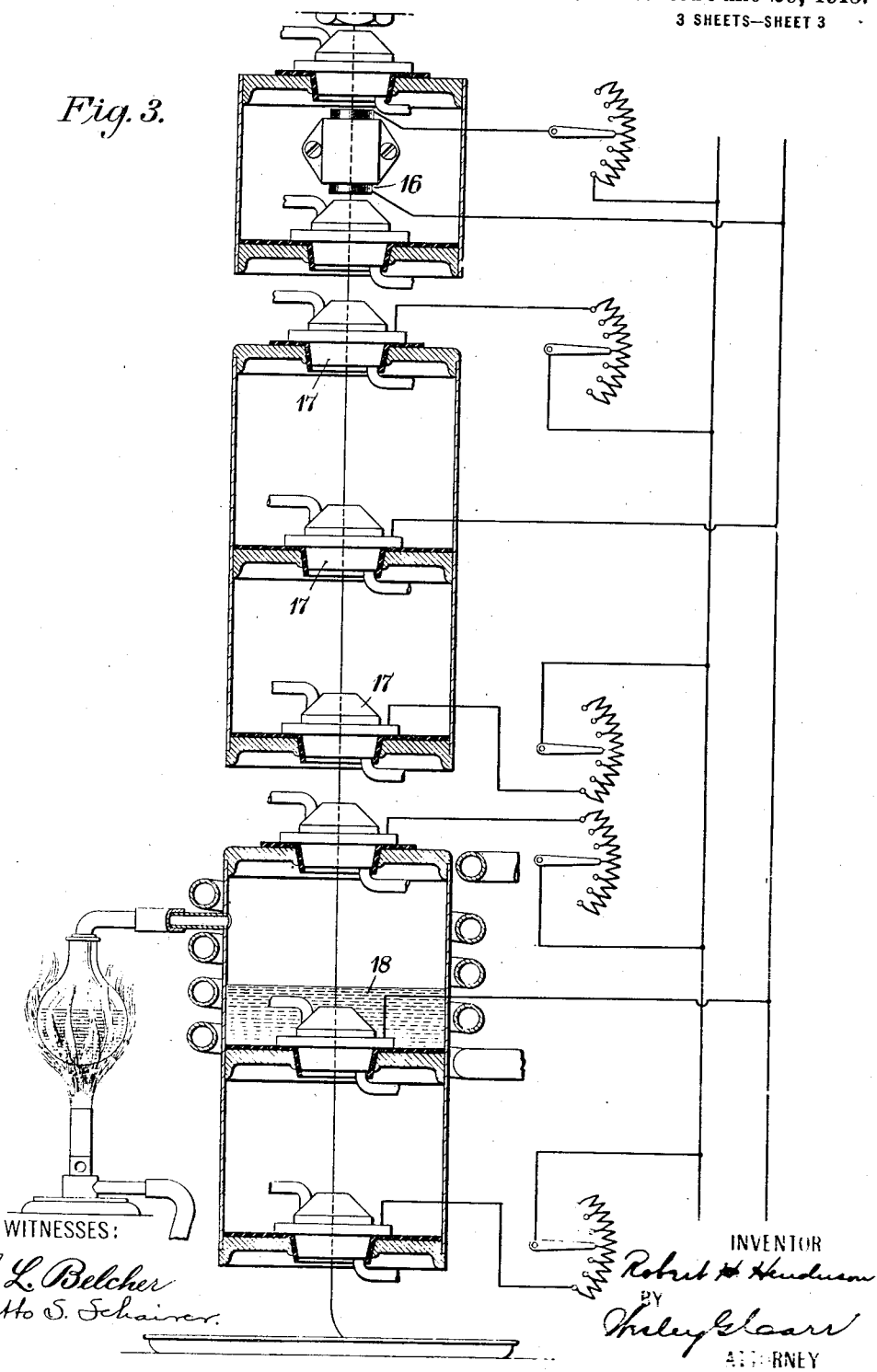

UNITED STATES PATENT OFFICE.

ROBERT H. HENDERSON, OF EAST ORANGE, NEW JERSEY, ASSIGNOR TO WESTINGHOUSE LAMP COMPANY, A CORPORATION OF PENNSYLVANIA.

PROCESS FOR MANUFACTURING INCANDESCENT FILAMENTS.

1,144,595.  Specification of Letters Patent. Patented June 29, 1915.

Application filed March 25, 1910. Serial No. 551,568

*To all whom it may concern:*

Be it known that I, ROBERT H. HENDERSON, a citizen of the United States, and a resident of East Orange, in the county of Essex and State of New Jersey, have invented a new and useful Improvement in Processes for Manufacturing Incandescent Filaments, of which the following is a specification.

My invention relates to processes of preparing filaments for incandescent lamps, and it has for its object to provide a process whereby filaments may be manufactured continuously.

In the ordinary process of manufacturing filaments for incandescent lamps each filament is prepared and finished individually. For this reason the uniformity of the filaments, which is an absolute necessity for the production of a uniformly high grade of incandescent lamps, is dependent to a large extent on the efficiency of the proper working conditions of the apparatus in the various operative stages through which the filament passes during its manufacture, as well as on the efficiency of the individual operators handling it. Moreover, the defects in the filaments caused by the inefficiency of apparatus or carelessness of operators, in the earlier stages of manufacture, cannot be subsequently remedied but are intensified in subsequent stages. In consequence of this the individual filaments obtained in the ordinary course of manufacture vary largely in density, cross-sectional area, surface, electrical conductivity, etc., and the resulting lamps differ accordingly in life, watt consumption, voltage, etc.

My invention renders it possible, by the continuous manufacture of the filament, to do away with the irregularities possessed by the individually manufactured filaments, and in particular to obtain close uniformity of their physical characteristics, such as density, cross-sectional area, electrical conductivity, etc., for the reason that the filaments are finished in one operation and the personal efficiency factor of the operators in the various filament manufacturing stages is largely eliminated.

Figure 1 of the accompanying drawings represents suitable apparatus for practising my invention, and Figs. 2 and 3 represent modified forms of the apparatus shown in Fig. 1.

The material 1 from which the filament is prepared is preferably in paste form and is placed in a press 2, from which it is squirted through a die 3 into filamentous form. The composition of the filamentous material may vary considerably, but is such that the proper treatments will render it suitable for use as filaments in incandescent lamps. A suitable composition for the making of carbon filaments consists of carbonized lamp black, *i. e.*, commercial lampblack that has been heated to a high degree to insure complete carbonization of all of its particles, mixed with a carbonaceous binding material, such as casein, gum arabic, or gum tragacanth. The material may also be such as is ordinarily used in the preparation of metallic filaments, and, to that end, it may consist of very finely divided metal, either alone or intimately mixed with a suitable binder.

As the material is prepared in the filamentous form, it is subjected successively, in different chambers during its movement, to different kinds of treatment. With carbon filaments, the first treatment is preferably that of carbonizing the binder in the filament, and, to that end, it may be heated in any suitable manner, as by means of a coil that surrounds the filament and is heated by the passage of an electrical current therethrough. In order that the filamentous material may be heated and carbonized gradually, it is passed successively through two coils 4 and 5 which have different resistances or are otherwise arranged to produce different degrees of heat. For the purpose of confining the heat produced by each coil so that there may be no material communication of the heat produced by one coil to the space within the other coil, an annular barrier 6 is placed between the coils and annular end members 7 and 8 are also provided therefor.

In order to completely seal the heat chambers, the barriers are provided at their centers with apertured members 9, composed of copper, or other suitable material, that may be amalgamated or for which mercury possesses a positive degree of capillary attraction, and the apertures may then be filled with mercury 10 to such an extent that the exposed surfaces of the mercury will be concave. When thus constructed, the filamentous material may pass through the mercury without dislodging it, and to prevent the mercury from vaporizing, the apertured barriers are provided with means for keeping them cool, such as coils through which a cooling medium passes.

In the preparation of carbon filaments, the carbonized filamentous material may be next passed into a chamber 11 containing a suitable gas or liquid. If it is desired to deposit carbon upon the filaments, the treatment chamber may contain a suitable carbonaceous gas, such as gasolene vapor, and the filament may be heated during its passage through the chamber. Heat may be advantageously applied to the filament by passing an electrical current through it, and, to that end, contact may be made with the filament as it enters and leaves the chamber, by means of terminal devices 12 and 13 that are similar to the devices 9, the mercury serving, in these cases, not only as seals, but also as means for making electrical connections to the filament.

If it is desired to treat the filament after its carbonization, in any other manner than that just described, the treatment chamber 14 (Fig. 2) may contain chemical compounds other than gasolene either in vaporous or liquid state. For instance, if it is desired to apply a thin coating of tungsten to a carbon filament, the treatment chamber 14 may be filled with tungsten hexachlorid vapor. Vaporous compounds may be kept from condensation by means of a heating coil surrounding the treatment chamber. A further heat treatment may then be applied to the filament in another and succeeding chamber 15.

In Fig. 2, the filamentous material is first treated after it leaves the press and while it runs through an air-tight compartment, by passing current through it, connection to the filament being effected by means of the mercury terminal devices above described.

In the case of metal filaments mixed with a binder, the filamentous material is first preferably carbonized by means of a carbonizing coil 16 (Fig. 3), for the purpose of improving its conductivity, though this may not be necessary or desirable in all cases. The filament is next passed through a series of apertured terminal devices 17, the apertures of which are filled with mercury, and increasing amounts of current are applied to the filament as it progresses in its movement for the purpose of gradually fusing or sintering its particles together. The next treatment may be that of passing the filament through a material 18 that chemically or otherwise reacts with, or attaches to, the filament, such, for instance, as silicon tetrachlorid ($SiCl_4$) vapor, the last treatment being a heat treatment.

It will, of course, be understood that the process may be practised by other means than those herein specifically shown and described, and that the character and sequence of the various treatments may also be varied from what have been set forth, without departing from the spirit of the invention, the essence of which is the successive application to a longitudinally moving filament of different kinds of treatment in different chambers.

I claim as my invention:

1. The process of preparing filaments for incandescent lamps which consists in longitudinally moving filamentous material through a succession of independent and sealed chambers and subjecting the same, while traversing through each chamber, to a different kind of treatment.

2. The process of preparing filaments for incandescent lamps which consists in longitudinally moving filamentous material through a succession of independent chambers, each of which is sealed, and subjecting the said material to physical changes while traversing through certain of said chambers and to chemical changes while traversing through certain other chambers.

3. The process of preparing filaments for incandescent lamps which consists in longitudinally moving filamentous material through a succession of independent sealed chambers and subjecting the same to physical changes while traversing through certain of said chambers and to chemical changes while traversing through certain other chambers, the treatments in the respective chambers being different.

4. The process of preparing filaments for incandescent lamps which consists in longitudinally moving filamentous material through a succession of independent sealed chambers and subjecting the same to different degrees of heat treatment while traversing through the different chambers.

5. The process of preparing filaments for incandescent lamps which consists in longitudinally moving filamentous material through a succession of independent sealed chambers and subjecting the same to different degrees of heat treatment while traversing through certain chambers and to chemical treatment while traversing through certain other chambers.

6. The process of preparing filaments for incandescent lamps which consists in longitudinally moving filamentous material through a succession of independent sealed chambers and subjecting the same to different degrees of heat treatment while traversing through certain of the chambers and to combined heat and chemical treatment while traversing through certain other chambers.

In testimony whereof, I have hereunto subscribed my name this fifth day of March 1910.

ROBERT H. HENDERSON.

Witnesses:
OTTO S. SCHAIRER,
CHARLES E. KELLY.